(12) United States Patent
Valentine et al.

(10) Patent No.: US 12,322,946 B2
(45) Date of Patent: Jun. 3, 2025

(54) LOW VOLTAGE CABLE CONDUIT SYSTEM FOR STADIUM SEATING FLOORING

(71) Applicants: Matthew James Valentine, Glendale, AZ (US); Justin Christopher Morcom, Phoenix, AZ (US)

(72) Inventors: Matthew James Valentine, Glendale, AZ (US); Justin Christopher Morcom, Phoenix, AZ (US)

( * ) Notice: Subject to any disclaimer, the term of this patent is extended or adjusted under 35 U.S.C. 154(b) by 289 days.

(21) Appl. No.: 18/114,907

(22) Filed: Feb. 27, 2023

(65) Prior Publication Data
US 2023/0275414 A1  Aug. 31, 2023

Related U.S. Application Data

(60) Provisional application No. 63/268,603, filed on Feb. 26, 2022.

(51) Int. Cl.
*H02G 3/38* (2006.01)
(52) U.S. Cl.
CPC .................................. *H02G 3/385* (2013.01)
(58) Field of Classification Search
None
See application file for complete search history.

(56) References Cited

U.S. PATENT DOCUMENTS

| 5,777,266 | A | 7/1998 | Herman |
| 6,145,996 | A * | 11/2000 | Shimada ............. E04F 11/1802 362/240 |
| 6,213,622 | B1 * | 4/2001 | Shimada .................. F21S 4/20 362/240 |
| 6,499,410 | B1 | 12/2002 | Berardi |
| 6,878,881 | B1 | 4/2005 | Henry |
| 9,673,601 | B2 | 6/2017 | Coffman |
| 10,801,216 | B1 * | 10/2020 | Anderson ........ E04F 15/02435 |
| 2005/0201091 | A1 * | 9/2005 | Kramer ................ F21V 33/006 362/249.01 |
| 2020/0112496 | A1 * | 4/2020 | Anderson ............... H04L 41/06 |

FOREIGN PATENT DOCUMENTS

RU           171173 U1    5/2017

* cited by examiner

*Primary Examiner* — Krystal Robinson (57) ABSTRACT

A low voltage cable conduit system for stadium seating flooring includes a tread base, a riser base, a tread cover, a riser cover, an inside-corner cover, and an outside-corner cover. The tread base and the riser base are mounted perpendicular to each other about a stadium seating flooring. The tread base is linearly enclosed by the tread cover, and a distal end of the tread cover is mounted to the tread base. The riser base is linearly enclosed by the riser cover. The inside-corner cover is positioned over a proximal end of the tread cover. The inside-corner cover can be mounted to the tread base through the proximal end of the tread cover and to the riser base through the proximal end of the riser cover. The outside-corner cover is positioned adjacent to a distal end of the riser cover and mounted to the riser base through the riser cover.

13 Claims, 12 Drawing Sheets

LOW VOLTAGE CABLE CONDUIT SYSTEM FOR STADIUM SEATING FLOORING

The current application claims a priority to the U.S. provisional patent application Ser. No. 63/268,603 filed on Feb. 26, 2022. The current application is filed on Feb. 27, 2023, while Feb. 26, 2023 was on a weekend.

FIELD OF THE INVENTION

The present invention relates to low voltage cable conduits. More specifically, the present invention is a low voltage cable conduit system for a stadium seating flooring.

BACKGROUND OF THE INVENTION

The need to update existing facilities with modern technology services including wireless access points (APs), audio/visual devices, and broadcasting equipment require low voltage communications, audio/visual, and broadcasting cabling to extend into or to cross the tiered, stadium seating levels where spectators are seated. Low voltage cabling must be managed and protected from the point of entry into the tiered, stadium seating spaces until it reaches its designated endpoint. Exposing low voltage cabling to foot traffic has two potential consequences. The first affects life safety due to the potential trip hazard it poses. The second affects product integrity as the delicate jacket of low voltage cable will be damaged if exposed to foot traffic degrading its performance and functionality. The cabling that is required to support modern technology services must be protected from foot traffic by an effective means of cable management.

It is objective of the present invention to provide a low voltage cable conduit system for stadium seating flooring as the present invention is assembled with multiple base plates and cover plates. More specifically, the base plates allow the low voltage cables to positioned and extended along the stadium seating flooring. The cover plates are mounted to the base plates so that the low voltage cable can be fully enclosed within the present invention. The present invention provides protection of low voltage cabling, specifically in facilities with ascending or descending tiers of stadium seating such as those found in sports and entertainment venues. The present invention complies with the "Thresholds" section of the Americans with Disabilities Act (ADA) of 1990. Pub. L. 101-336. § 404.2.5. 26 Jul. 1990. 104 Stat. 328. The present invention is manufactured with weather-resistant and corrosion-resistant material to withstand the elements including rain, snow, ice, hail, and UV exposure.

DETAIL DESCRIPTIONS OF THE INVENTION

All illustrations of the drawings are for the purpose of describing selected versions of the present invention and are not intended to limit the scope of the present invention.

Figure 1:
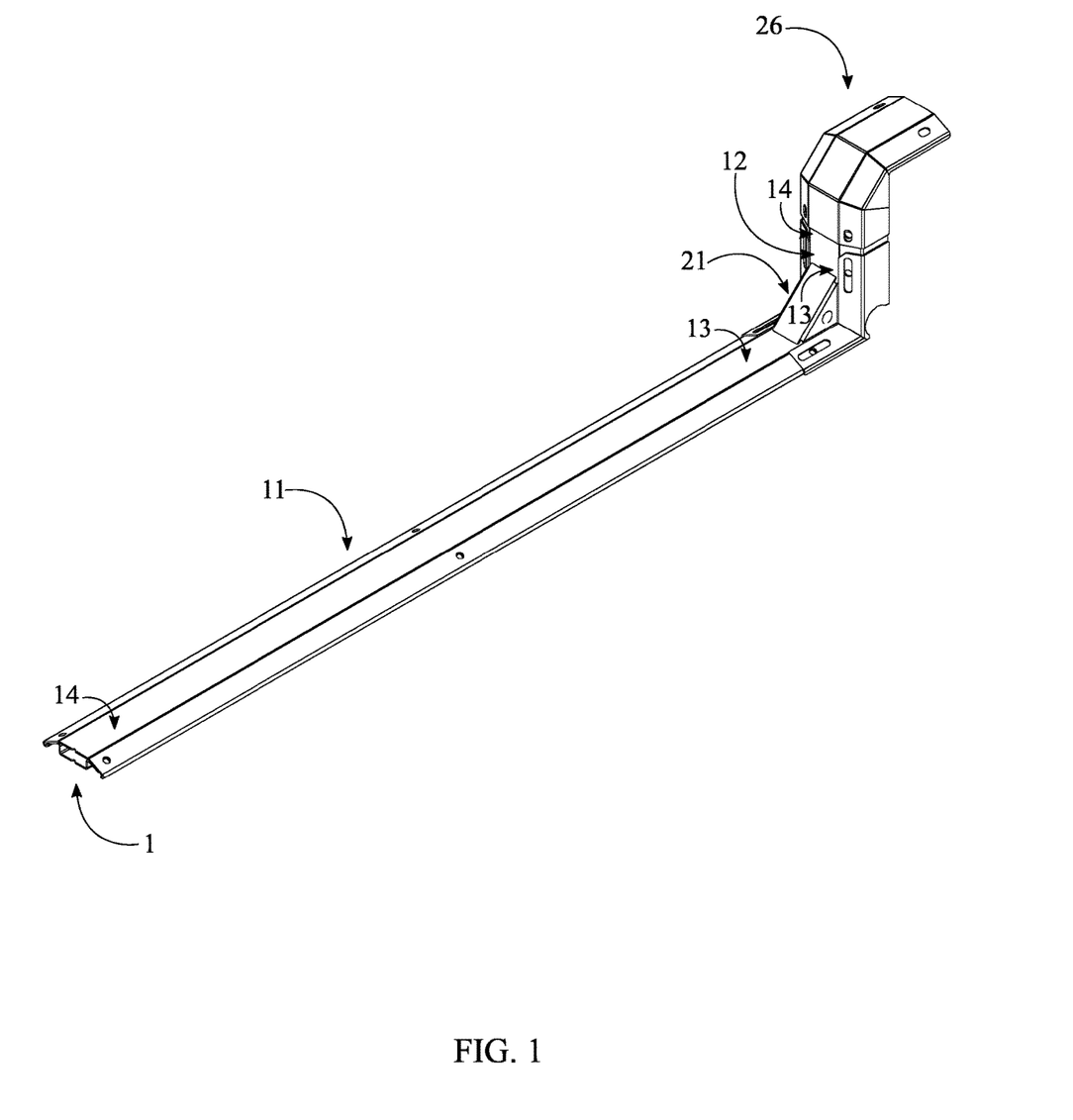
FIG. 1 is a top perspective view of the present invention.
Figure 2:
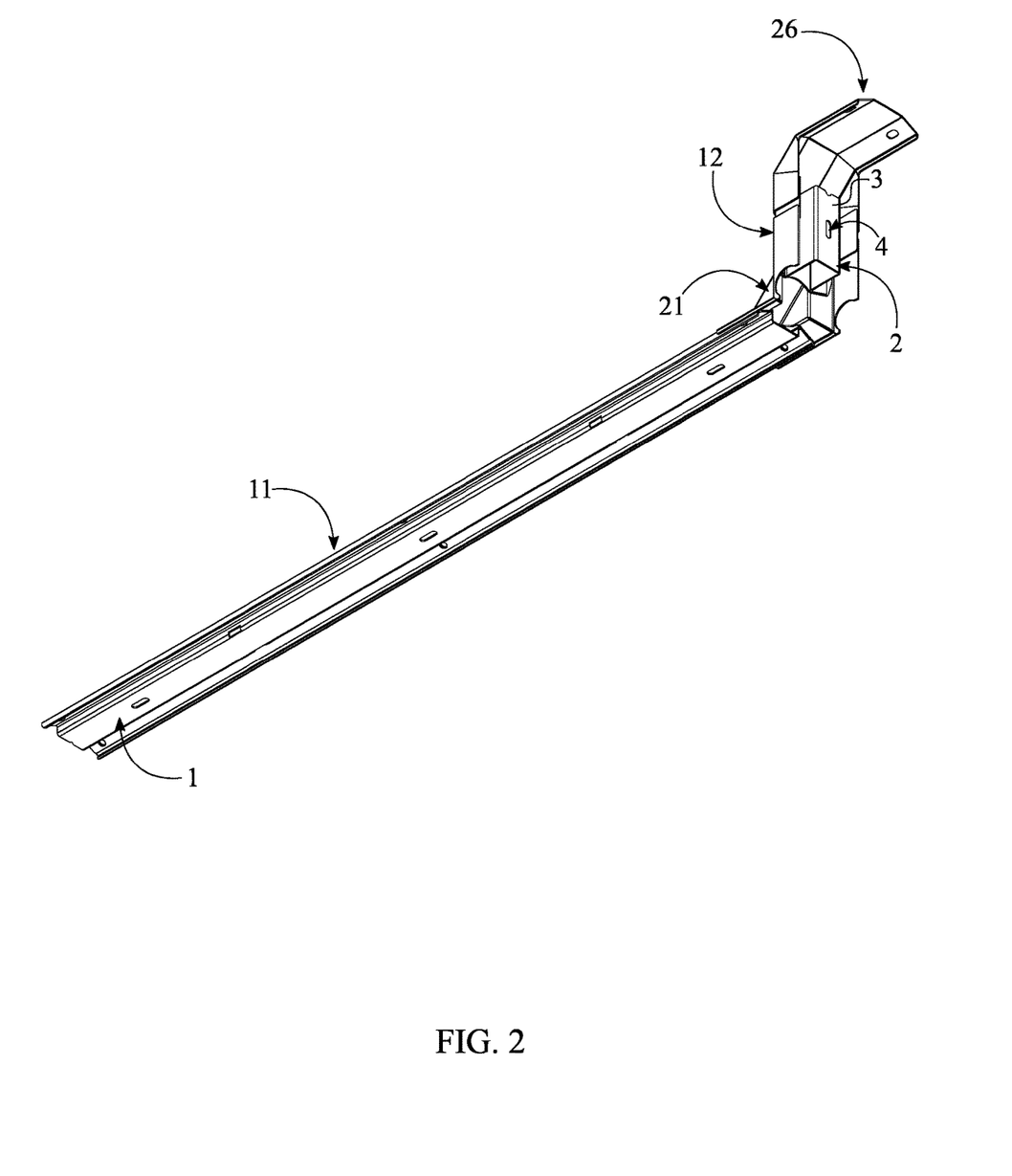
FIG. 2 is a bottom perspective view of the present invention.

The present invention is a low voltage cable conduit system for stadium seating flooring so that a set of cables can be effectively and efficiently protected as it ascends or descends tiered levels of stadium seating commonly found in sports and entertainment venues. The present invention is designed as an indoor/outdoor cable management system and installed across an accessible route. The present invention is designed and installed in compliance with the "Thresholds" section of the Americans with Disabilities Act (ADA) of 1990. Pub. L. 101-336. § 404.2.5. 26 Jul. 1990. 104 Stat. 328. In reference to the stadium seating flooring, the horizontal component is often referred as "tread" and the vertical component is often referred as "riser". As shown in FIG. 1 and FIG. 2, the present invention comprises a tread base 1, a riser base 2, a tread cover 11, a riser cover 12, an inside-corner cover 21, and an outside-corner cover 26 as the aforementioned components are able to fully enclose a set of low voltage cables along the stadium seating flooring.

Figure 3:
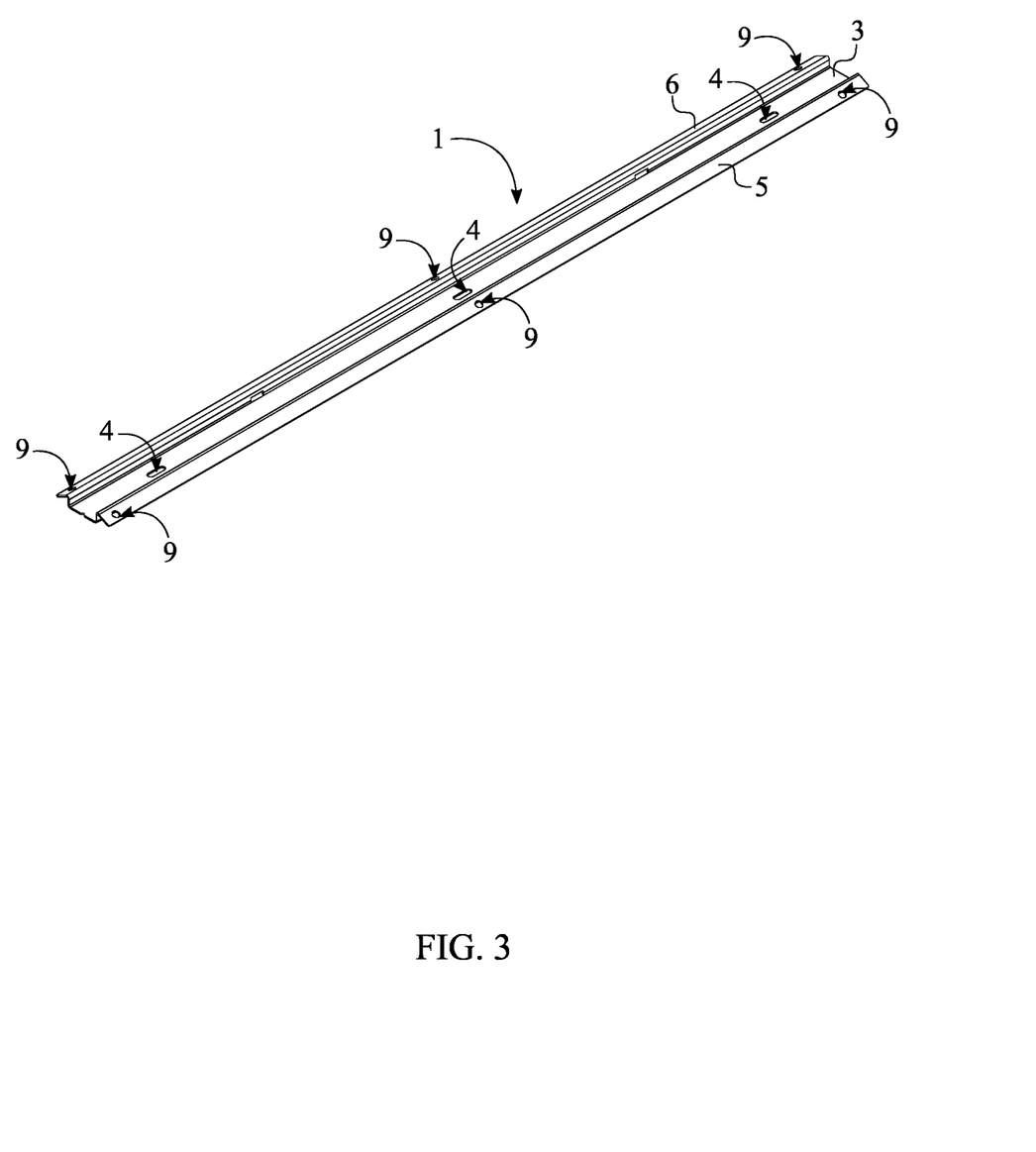
FIG. 3 is a top perspective view of the tread base of the present invention.

In reference to the general configuration of the present invention, as shown in FIGS. 1-3, the tread base 1 and the riser base 2 function as the mounting brackets and each comprises a base plate 3, a first channel wall 5, and a second channel wall 6. The tread cover 11 and the riser cover 12 function as covering housings and each comprise a cover plate 15, a first lateral cover 16, and a second lateral cover 17. In other words, the tread base 1 is enclosed by the tread cover 11. The riser base 2 is enclosed by the riser cover 12 so that the inside-corner cover 21 and the outside-corner cover 26 can function as transition bodies in between the tread cover 11 and the riser cover 12. The tread base 1 and the riser base 2 are mounted perpendicular to each other. For example, the tread base 1 is mounted to the tread of the stadium seating and the riser base 2 is mounted to the riser of the stadium seating. The tread base 1 provides sufficient space to position the set of cables and is linearly enclosed by the tread cover 11. A distal end 14 of the tread cover 11 is mounted to the tread base 1 thus securing a free end of the tread cover 11 to the tread base 1. The riser base 2 provides sufficient space to position the set of cables and is linearly enclosed by the riser cover 12. The inside-corner cover 21 is positioned over a proximal end 13 of the tread cover 11 and a proximal end 13 of the riser cover 12 so that the exposed section for the set of cables extending from the tread base 1 to the riser base 2 can be protected. More specifically, the inside-corner cover 21 is mounted to the tread base 1 through the proximal end 13 of the tread cover 11 thus securing a fixed end of the tread cover 11 to the tread base 1. The inside-corner cover 21 is mounted to the riser base 2 through the proximal end 13 of the riser cover 12 thus securing a fixed of the riser cover 12 to the riser base 2. The outside-corner cover 26 is positioned adjacent to a distal end 14 of the riser cover 12 so that the set of cables can lead into a subsequent embodiment of the present invention. More specifically, the outside-corner cover 26 is mounted to the riser base 2 through the distal end 14 of the riser cover 12 thus securing a free end of the riser cover 12 to the riser base 2.

Figure 4:
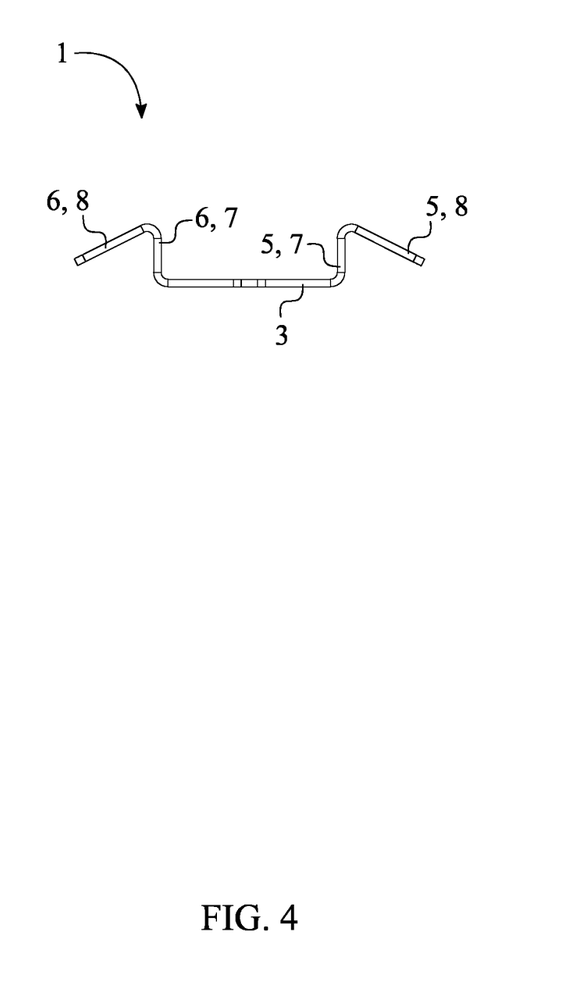
FIG. 4 is a front view of the tread base of the present invention.
Figure 9:
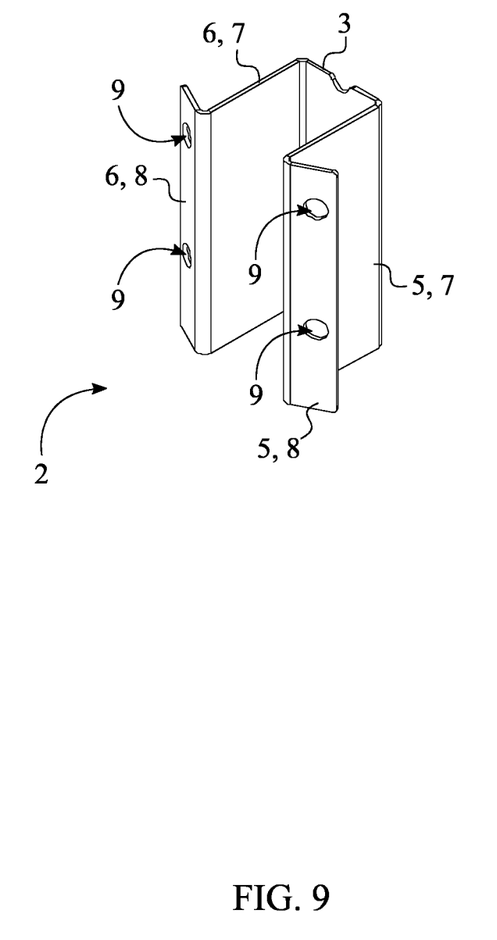
FIG. 9 is a top perspective view of the riser base of the present invention.

In reference to FIG. 3, FIG. 4, and FIG. 9, the first channel wall 5 and the second channel wall 6 are oppositely positioned of each other across the base plate 3. More specifically, the base plate 3 is positioned adjacent to stadium flooring as the first channel wall 5 and the second channel wall 6 delineate the height of the tread base 1 and the depth of the riser base 2. The first channel wall 5 is positioned perpendicular to the base plate 3 and terminally connected to the base plate 3. The second channel wall 6 is positioned perpendicular to the base plate 3 and terminally connected to the base plate 3. As a result, the first channel wall 5 and the second channel wall 6 are outwardly oriented from the tread of the stadium seating and the riser of the stadium seating. The tread base 1 and the riser base 2 may each further comprise a plurality of mounting holes 4 so that the present invention can be secured to the stadium seating flooring. As shown in FIG. 2 and FIG. 3, the plurality of mounting holes 4 traversing through the base plate 3 so that a plurality of mounting fasteners can be utilized to mount the tread base 1 and the riser base 2 to the stadium seating flooring.

In reference to FIG. 4 and FIG. 9, the first channel wall 5 and the second channel wall 6 may each comprise a straight section 7, an outer rail section 8, and a plurality of fastener attachments 9. The outer rail section 8 and the base plate 3 are oppositely positioned of each other about the straight section 7 thus defining the shape of the first channel wall 5 and the second channel wall 6. More specifically, the straight section 7 is terminally connected to the base plate 3 and positioned perpendicular to the base plate 3. The outer rail section 8 is terminally connected to the straight section 7 and angularly oriented outward and towards the base plate 3. As a result, the outer rail section 8 provides a designated surface area to rest the tread cover 11 or the riser cover 12. The plurality of fastener attachments 9 traverses through the outer rail section 8, wherein each of the plurality of fastener attachments 9 is a threaded opening that can engage with a threaded male attachment.

Figure 5:
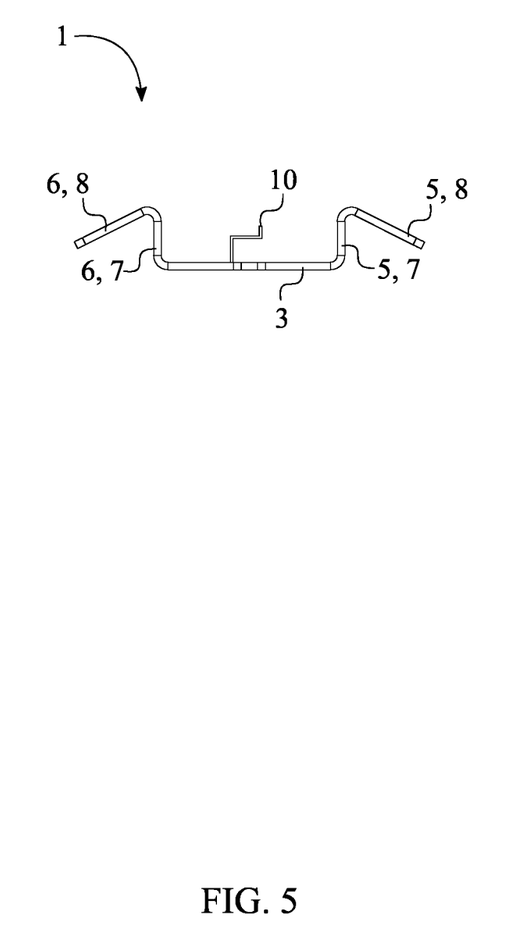
FIG. 5 is a front view of the tread base of the present invention with the central support.

In reference to FIG. 5, the present invention may further comprise a central support 10 to further strengthen the structural integrity. More specifically, the central support 10 is positioned in between the first channel wall 5 and the second channel wall 6 and centrally connected along the base plate 3 of the tread base 1. As a result, the central support 10 is able to strengthen the cover plate 15 of the tread cover 11 when the present invention is assembled.

Figure 6:
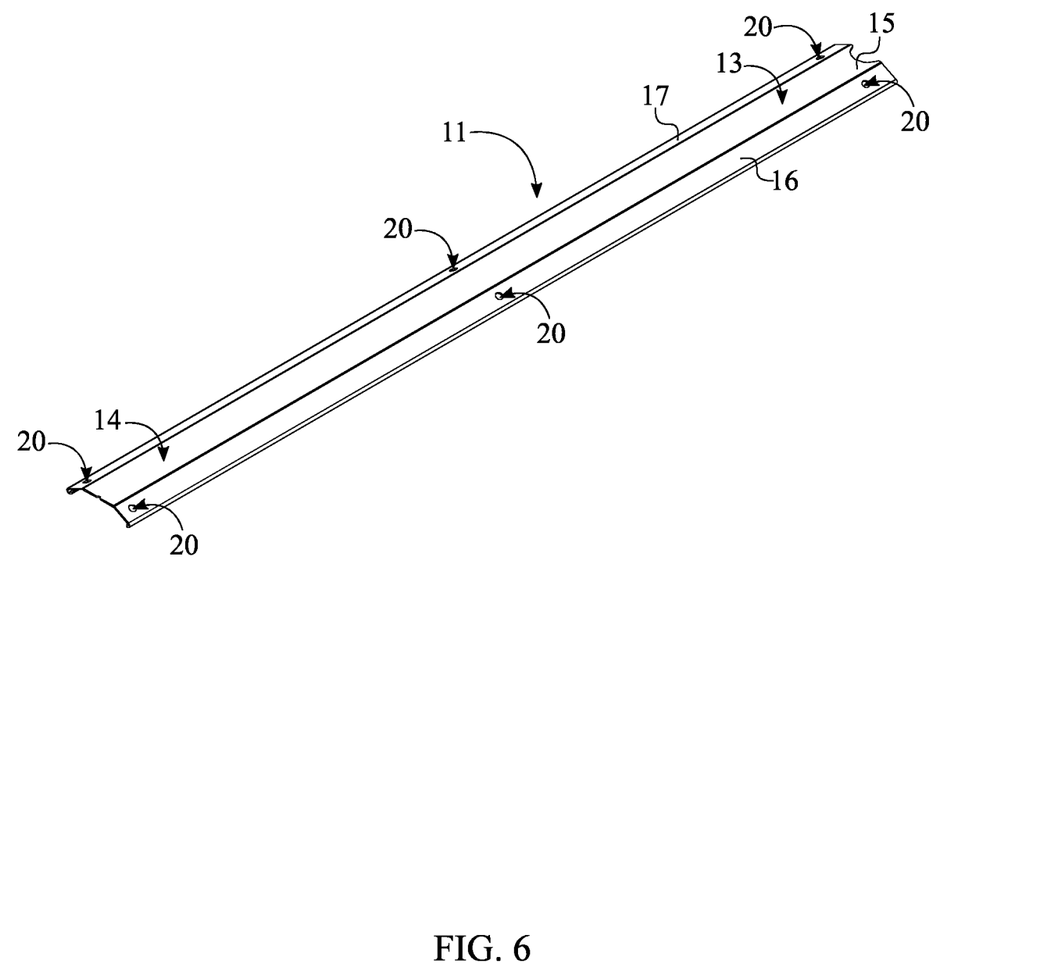
FIG. 6 is a top perspective view of the tread cover of the present invention.
Figure 7:
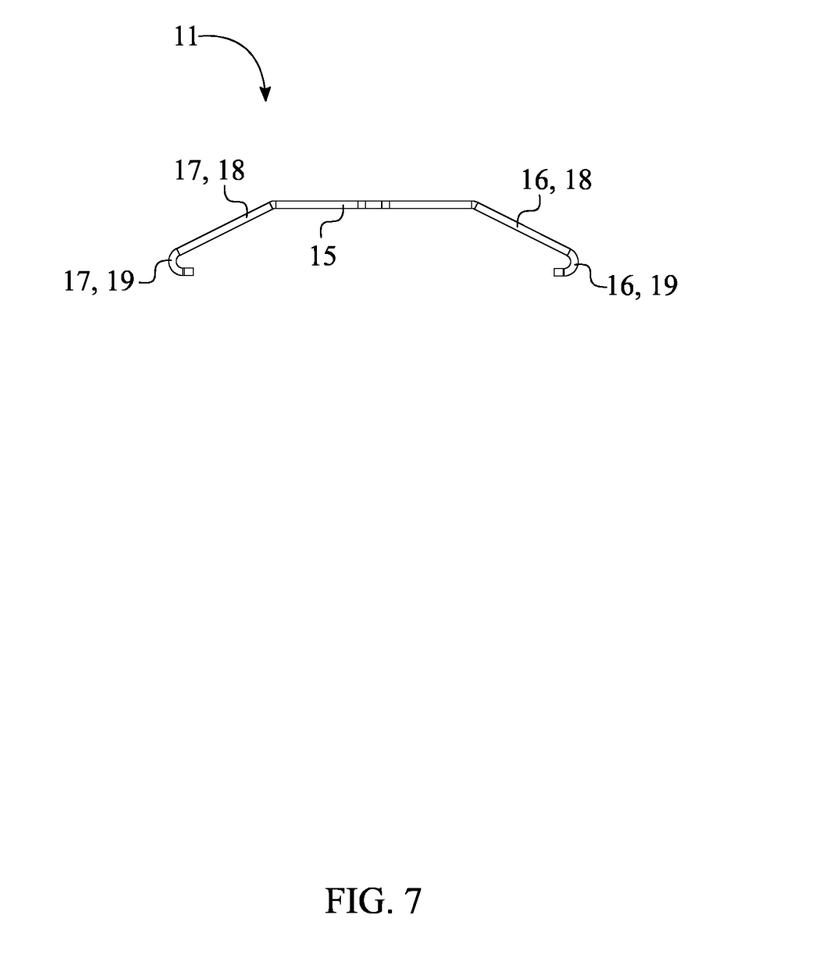
FIG. 7 is a front view of the tread cover of the present invention.
Figure 10:
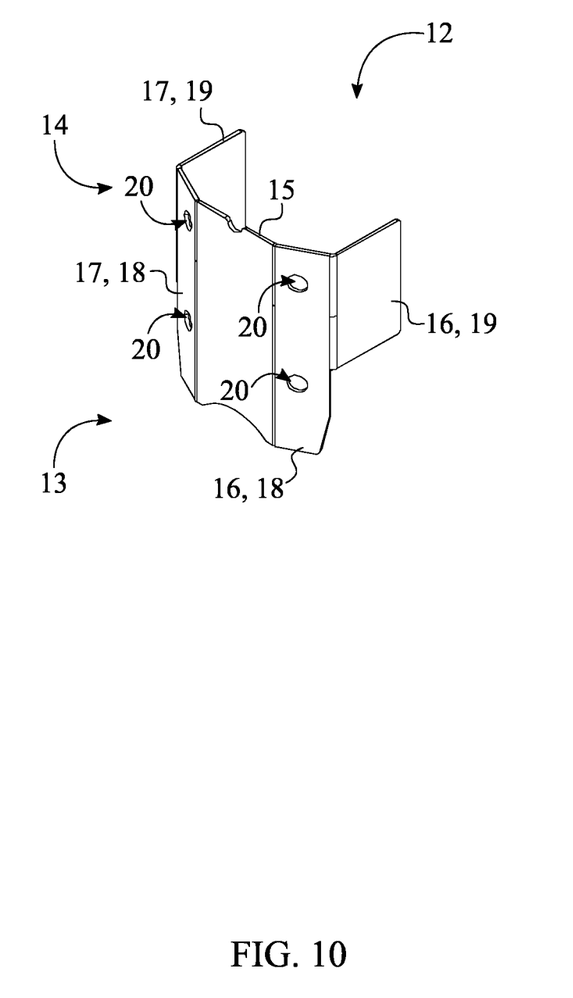
FIG. 10 is a top perspective view of the riser cover of the present invention.

In reference to FIG. 6, FIG. 7, and FIG. 10, the first lateral cover 16 and the second lateral cover 17 are oppositely positioned of each other across the cover plate 15 to fully enclose the tread base 1 and the riser base 2. More specifically, the first lateral cover 16 is angularly positioned to the cover plate 15 and terminally connected to the cover plate 15. The second lateral cover 17 is angularly positioned to the cover plate 15 and terminally connected to the cover plate 15. For example, when the tread cover 11 is placed atop the tread base 1, the cover plate 15 encloses the base plate 3, the first lateral cover 16 is adjacently engaged to the first channel wall 5, and the second lateral cover 17 is adjacently engaged to the second channel wall 6. Similarly, when the riser cover 12 is placed atop the riser base 2, the cover plate 15 encloses the base plate 3, the first lateral cover 16 is adjacently engaged to the first channel wall 5, and the second lateral cover 17 is adjacently engaged to the second channel wall 6. Preferably, the cover plate 15 is made with a commercially available outdoor-rated friction tape solution available in different colors and grit rating to mitigate the risk of slipping on the low friction surface of the cover plate 15.

In reference to FIG. 7 and FIG. 10, the first lateral cover 16 and the second lateral cover 17 may each comprise an angled section 18, an inner rail section 19, and a plurality of fastener receiving openings 20. The inner rail section 19 and the cover plate 15 is oppositely positioned of each other about the angled section 18, thus defining the orientation of the first lateral cover 16 and the second lateral cover 17. More specifically, the angled section 18 is terminally connected to the cover plate 15 and oriented toward the base plate 3. As a result, the angled section 18 and the cover plate 15 define an obtuse angle about an inner surface of the tread cover 11 or the riser cover 12. The inner rail section 19 is terminally connected to the angled section 18 and formed into an opened semi-circular shape that opened towards the cover plate 15. The plurality of fastener receiving openings 20 traverses through the angled section 18, wherein each receiving opening functions as a channel to insert the threaded male attachments through the first lateral cover 16 and the second lateral cover 17 during the assembly process.

As shown in FIG. 1 and FIG. 2, in reference to the attachment between the distal end 14 of the tread cover 11 and the tread base 1, the plurality of fastener receiving openings 20 of the first lateral cover 16 is aligned with the plurality of fastener attachments 9 of the first channel wall 5. The plurality of fastener receiving openings 20 of the second lateral cover 17 is aligned with the plurality of fastener attachments 9 of the second channel wall 6. Resultantly, a threaded male attachment can be utilized to mount the first lateral cover 16 to a corresponding attachment of the plurality of fastener attachments 9 for the first channel wall 5 through a corresponding opening of the plurality of fastener receiving openings 20. Similarly, a threaded male attachment can be utilized to mount the second lateral cover 17 to a corresponding attachment of the plurality of fastener attachments 9 for the second channel wall 6 through a corresponding opening of the plurality of fastener receiving openings 20.

Figure 8:
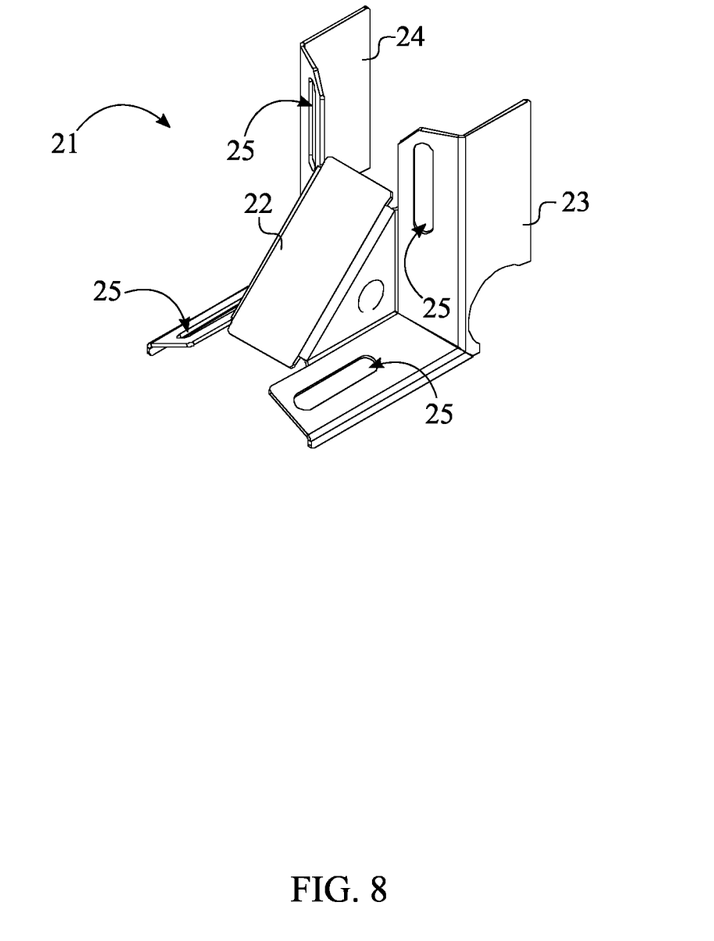
FIG. 8 is a top perspective view of the inside-corner cover of the present invention.

As shown in FIG. 8, the inside-corner cover 21 may comprise an inside case 22, a first connector 23, and a second connector 24, and a plurality of fastener receiving holes 25. The first connector 23 and the second connector 24 are oppositely positioned of each other about the inside case 22 as the inside case 22 provide the transitional coverage from the cover plate 15 of the tread cover 11 to the cover plate 15 of riser cover 12. In other words, the inside case 22 is adjacently positioned over the cover plate 15 of the tread cover 11 and the cover plate 15 of the riser cover 12 about the proximal end 13. The first connector 23 is terminally connected to the inside case 22 so that the first connector 23 is able to adjacently position over the first lateral cover 16 of the tread cover 11 and the first lateral cover 16 of the riser cover 12. The second connector 24 is terminally connected to the inside case 22 so that the second connector 24 is able to adjacently position over the second lateral cover 17 of the tread cover 11 and the second lateral cover 17 of the riser cover 12. The plurality of fastener receiving holes 25 traverses through the first connector 23 and the second connector 24, wherein each receiving hole functions as a channel to insert the threaded male attachments through the first connector 23 and the second connector 24 during the assembly process.

The inside-corner cover 21 may further comprise a knock-out opening so that additional cables can feed in or out from the inside-corner cover 21. More specifically, the knockout opening is laterally integrated into the inside case 22 thus enabling the user to keep or remove the knockout opening upon assembly preference and requirements.

As shown in FIG. 1 and FIG. 2, in order to attach the inside-corner cover 21 to the proximal end 13 of the tread cover 11 and the proximal end 13 of the riser cover 12, the threaded male attachments are inserted through the plurality of fastener receiving holes 25. More specifically, a threaded male attachment is utilized to mount the first connector 23 to a corresponding attachment of the plurality of fastener attachments 9 for the first channel wall 5 through a corresponding hole of the plurality of fastener receiving holes 25 and a corresponding opening of the plurality of fastener receiving openings 20. Resultantly, the threaded male attachment is able to secure the first connector 23 to the first channel wall 5 via the first lateral cover 16. A threaded male attachment is utilized to mount the second connector 24 to a corresponding attachment of the plurality of fastener attachments 9 for the second channel wall 6 through a corresponding hole of the plurality of fastener receiving holes 25 and a corresponding opening of the plurality of fastener receiving openings 20. Resultantly, the threaded male attachment is able to secure the second connector 24 to the second channel wall 6 via the second lateral cover 17.

Figure 11:
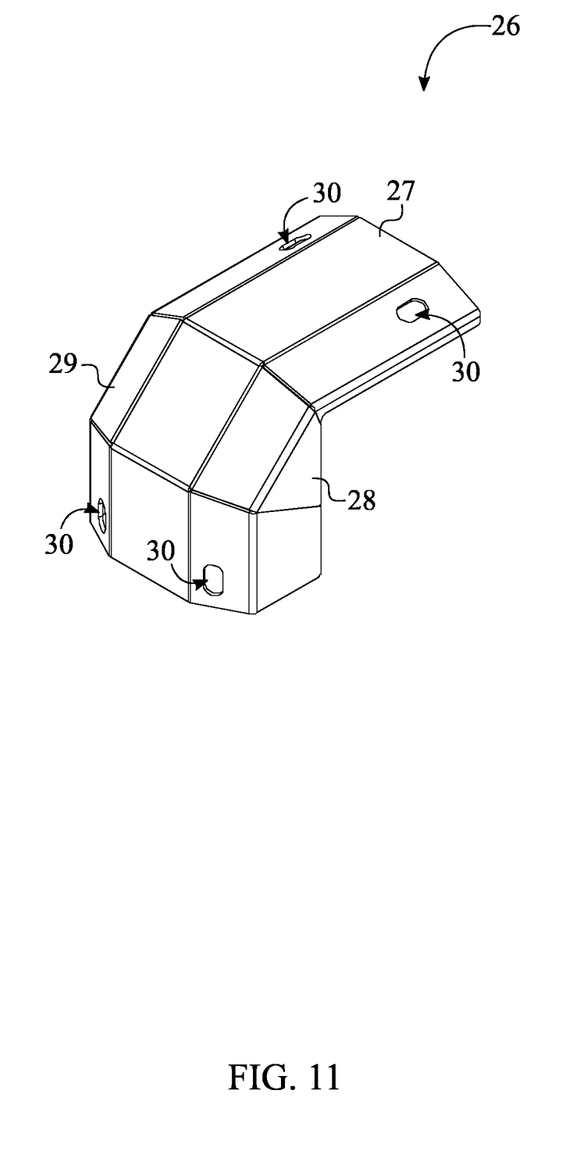
FIG. 11 is a top perspective view of the outside-corner cover of the present invention.

As shown in FIG. 11, the outside-corner cover 26 may comprise an outside case 27, a third connector 28, and a fourth connector 29, and a plurality of fastener receiving cavities 30. The third connector 28 and the fourth connector 29 are oppositely positioned of each other about the outside case 27 as the outside case 27 provide the transitional coverage from the cover plate 15 of riser cover 12 to the subsequent embodiment of the present invention. In other words, the outside case 27 is adjacently positioned over the cover plate 15 of the riser cover 12 about the distal end 14. The third connector 28 is terminally connected to the outside case 27 so that the third connector 28 is able to adjacently position over the first lateral cover 16 of the riser cover 12. The fourth connector 29 is terminally connected to the outside case 27 so that the fourth connector 29 is able to adjacently position over the second lateral cover 17 of the riser cover 12. The plurality of fastener receiving cavities 30 traverses through the third connector 28 and the fourth connector 29, wherein each receiving cavity functions as a channel to insert the threaded male attachments through the third connector 28 and the fourth connector 29 during the assembly process.

As shown in FIG. 1 and FIG. 2, in order to attach the outside-corner cover 26 to the distal end 14 of the riser cover 12, the threaded male attachments are inserted through the plurality of fastener receiving cavities 30. More specifically, a threaded male attachment is utilized to mount the third connector 28 to a corresponding attachment of the plurality of fastener attachments 9 for the first channel wall 5 through a corresponding cavity of the plurality of fastener receiving cavities 30 and a corresponding opening of the plurality of fastener receiving openings 20. Resultantly, the threaded male attachment is able to secure the third connector 28 to the first channel wall 5 via the first lateral cover 16. A threaded male attachment is utilized to mount the fourth connector 29 to a corresponding attachment of the plurality of fastener attachments 9 for the second channel wall 6 through a corresponding cavity of the plurality of fastener receiving cavities 30 and a corresponding opening of the plurality of fastener receiving openings 20. Resultantly, the threaded male attachment is able to secure the fourth connector 29 to the second channel wall 6 via the second lateral cover 17.

Figure 12:
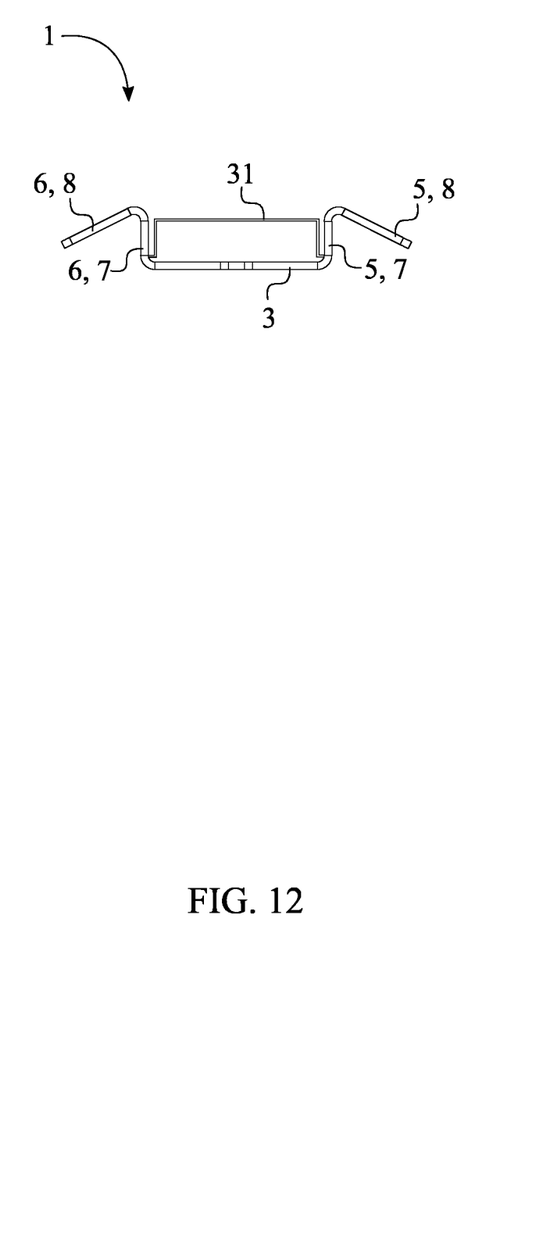
FIG. 12 is a front view of the tread base of the present invention with the at least one securing clip.

As shown in FIG. 12, the present invention may further comprise at least one securing clips 31. The at least one securing clips 31 is removably engaged to the first channel wall 5 and the second channel wall 6 of the tread base 1 in such a way that each of the plurality of securing clip is extended across the base plate 3 of the tread base 1. The at least one securing clips 31 further secure the set of cables to the tread base 1 so that the tread cover 11 can be firmly secured without any deformation.

In a preferred embodiment of the present invention, the length of the tread cover 11 from the proximal end 13 to the distal end 14 can range from 18 inches to 120 inches. The height of the riser cover 12 from the proximal end 13 to the distal end 14 can range from 3 inches to 120 inches. Furthermore, the weight of the riser cover 12 and the tread cover 11 from the first lateral cover 16 to the second lateral cover 17 can range from 1.5 inches to 47.5 inches. In order to comply with the ADA guidelines (4.13.8) known as "Thresholds at Doorways" that states that a threshold should be no higher than ½", an overall height that is measured from the inner rail section 19 of the tread cover 11 to the cover plate 15 of the tread cover 11 is measured less than 0.5 inches. In order to comply with ADA guideline (4.5.2) known as "Changes in Level" that provides clarity that changes in level up to ½", a beveled edge that is formed by the angled section 18 and the inner rail section 19 of the tread cover 11 has a slope no greater than 1:2.

The present invention is preferably made from made of stainless steel or any other similar material which inherently weather-resistant and corrosion-resistant to withstand the elements including rain, snow, ice, hail, and UV exposure. Similarly, the present invention is able to withstand regular usage of pressure washers and gas-powered blowers commonly used to clean stadiums and arenas after events. Furthermore, the present invention is also able withstand the use of corrosive deicing solutions to melt snow and ice as well as the salt laden air found in coastal climates.

Although the invention has been explained in relation to its preferred embodiment, it is to be understood that many other possible modifications and variations can be made without departing from the spirit and scope of the invention as hereinafter claimed.

What is claimed is:

1. A low voltage cable conduit system for stadium seating flooring comprising:
    a tread base;
    a riser base;
    a tread cover;
    a riser cover;
    an inside-corner cover;
    an outside-corner cover;
    the tread base and the riser base each comprising a base plate, a first channel wall, and a second channel wall;
    the tread cover and the riser cover each comprising a cover plate, a first lateral cover, and a second lateral cover;
    the tread base and the riser base being mounted perpendicular to each other;
    the tread base being linearly enclosed by the tread cover;
    a distal end of the tread cover being mounted to the tread base;
    the riser base being linearly enclosed by the riser cover;

the inside-corner cover being positioned over a proximal end of the tread cover and a proximal end of the riser cover;

the inside-corner cover being mounted to the tread base through the proximal end of the tread cover;

the inside-corner cover being mounted to the riser base through the proximal end of the riser cover;

the outside-corner cover being positioned adjacent to a distal end of the riser cover; and the outside-corner cover being mounted to the riser base through the distal end of the riser cover.

2. The low voltage cable conduit system for stadium seating flooring as claimed in claim 1 comprising:

the first lateral cover and the second lateral cover being oppositely positioned of each other across the cover plate;

the first lateral cover being angularly positioned to the cover plate;

the first lateral cover being terminally connected to the cover plate;

the second lateral cover being angularly positioned to the cover plate; and the second channel wall being terminally connected to the cover plate.

3. The low voltage cable conduit system for stadium seating flooring as claimed in claim 2 comprising:

the first lateral cover and the second lateral cover each comprising an angled section, an inner rail section, and a plurality of fastener receiving openings;

the inner rail section and the cover plate being oppositely positioned of each other about the angled section;

the angled section being terminally connected to the cover plate;

the inner rail section being terminally connected to the angled section; and the plurality of fastener receiving openings traversing through the angled section.

4. The low voltage cable conduit system for stadium seating flooring as claimed in claim 1 comprising:

the first lateral cover being adjacently engaged to the first channel wall;

the second lateral cover being adjacently engaged to the second channel wall; and the base plate being enclosed by the cover plate.

5. The low voltage cable conduit system for stadium seating flooring as claimed in claim 1 comprising:

the first channel wall and the second channel wall each comprising a plurality of fastener attachments;

the first lateral cover and the second lateral cover each comprising a plurality of fastener receiving openings;

the plurality of fastener receiving openings of the first lateral cover being aligned with the plurality of fastener attachments of the first channel wall;

the plurality of fastener receiving openings of the second lateral cover being aligned with the plurality of fastener attachments of the second channel wall;

the first lateral cover being mounted to a corresponding attachment of the plurality of fastener attachments for the first channel wall through a corresponding opening of the plurality of fastener receiving openings; and the second lateral cover being mounted to a corresponding attachment of the plurality of fastener attachments for the second channel wall through a corresponding opening of the plurality of fastener receiving openings.

6. The low voltage cable conduit system for stadium seating flooring as claimed in claim 1 comprising:

the inside-corner cover comprising an inside case, a first connector, and a second connector, and a plurality of fastener receiving holes;

the first connector and the second connector being oppositely positioned of each other about the inside case;

the first connector being terminally connected to the inside case;

the second connector being terminally connected to the inside case;

the inside case being adjacently positioned over the cover plate of the tread cover and the cover plate of the riser cover;

the first connector being adjacently positioned over the first lateral cover of the tread cover and the first lateral cover of the riser cover;

the second connector being adjacently positioned over the second lateral cover of the tread cover and the second lateral cover of the riser cover; and the plurality of fastener receiving holes traversing through the first connector and the second connector.

7. The low voltage cable conduit system for stadium seating flooring as claimed in claim 6 comprising:

the first connector being mounted to a corresponding attachment of the plurality of fastener attachments for the first channel wall through a corresponding hole of the plurality of fastener receiving holes and a corresponding opening of the plurality of fastener receiving openings; and the second connector being mounted to a corresponding attachment of the plurality of fastener attachments for the second channel wall through a corresponding hole of the plurality of fastener receiving holes and a corresponding opening of the plurality of fastener receiving openings.

8. The low voltage cable conduit system for stadium seating flooring as claimed in claim 1 comprising:

the outside-corner cover comprising an outside case, a third connector, and a fourth connector, and a plurality of fastener receiving cavities;

the third connector and the fourth connector being oppositely positioned of each other about the outside case;

the third connector being terminally connected to the outside case;

the fourth connector being terminally connected to the outside case;

the outside case being adjacently positioned over the cover plate of the riser cover;

the third connector being adjacently positioned over the first lateral cover of the riser cover;

the fourth connector being adjacently positioned over the second lateral cover of the riser cover; and the plurality of fastener receiving cavities traversing through the third connector and the fourth connector.

9. The low voltage cable conduit system for stadium seating flooring as claimed in claim 8 comprising:

the third connector being mounted to a corresponding attachment of the plurality of fastener attachments for the first channel wall through a corresponding cavity of the plurality of fastener receiving cavities and a corresponding opening of the plurality of fastener receiving openings; and the fourth connector being mounted to a corresponding attachment of the plurality of fastener attachments for the second channel wall through a corresponding cavity of the plurality of fastener receiving cavities and a corresponding opening of the plurality of fastener receiving openings.

10. The low voltage cable conduit system for stadium seating flooring as claimed in claim 1 comprising:
   at least one securing clips;
   the at least one securing clips being removably engaged to the first channel wall and the second channel wall of the tread base; and
   the at least one securing clips being extended across the base plate of the tread base.

11. The low voltage cable conduit system for stadium seating flooring as claimed in claim 1 comprising:
   the tread base and the riser base each comprising a plurality of mounting holes;
   the first channel wall and the second channel wall being oppositely positioned of each other across the base plate;
   the first channel wall being positioned perpendicular to the base plate;
   the first channel wall being terminally connected to the base plate;
   the second channel wall being positioned perpendicular to the base plate;
   the second channel wall being terminally connected to the base plate; and
   the plurality of mounting holes traversing through the base plate.

12. The low voltage cable conduit system for stadium seating flooring as claimed in claim 11 comprising:
   the first channel wall and the second channel wall each comprising a straight section, an outer rail section, and a plurality of fastener attachments;
   the outer rail section and the base plate being oppositely positioned of each other about the straight section;
   the straight section being terminally connected to the base plate;
   the outer rail section being terminally connected to the straight section; and
   the plurality of fastener attachments traversing through the outer rail section.

13. The low voltage cable conduit system for stadium seating flooring as claimed in claim 11 comprising:
   a central support;
   the central support being positioned in between the first channel wall and the second channel wall; and
   the central support being centrally connected along the base plate of the tread base.

\* \* \* \* \*